United States Patent
Kotecha et al.

(10) Patent No.: US 9,007,980 B2
(45) Date of Patent: Apr. 14, 2015

(54) MULTICAST-UNICAST HANDOFF SERVICES

(75) Inventors: Lalit R. Kotecha, San Ramon, CA (US); Jay J. Lee, San Ramon, CA (US); David Chiang, Fremont, CA (US); Steven R. Rados, Danville, CA (US); John F. Macias, Antelope, CA (US); Yee Sin Chan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 13/154,653

(22) Filed: Jun. 7, 2011

(65) Prior Publication Data

US 2012/0314641 A1    Dec. 13, 2012

(51) Int. Cl.
| | |
|---|---|
| H04H 20/71 | (2008.01) |
| H04W 4/00 | (2009.01) |
| H04H 20/42 | (2008.01) |
| H04W 72/00 | (2009.01) |
| H04L 29/06 | (2006.01) |
| H04W 4/06 | (2009.01) |
| H04W 76/00 | (2009.01) |

(52) U.S. Cl.
CPC ............ H04H 20/42 (2013.01); H04W 72/005 (2013.01); H04L 65/4076 (2013.01); H04L 65/103 (2013.01); H04W 4/06 (2013.01); H04W 76/002 (2013.01)

(58) Field of Classification Search
USPC .................................................. 370/312, 338
See application file for complete search history.

(56) References Cited

U.S. PATENT DOCUMENTS

| | | | |
|---|---|---|---|
| 2002/0163902 A1* | 11/2002 | Takao et al. .................... | 370/338 |
| 2005/0085254 A1* | 4/2005 | Chuah et al. ................... | 455/522 |
| 2009/0279701 A1* | 11/2009 | Moisand et al. ............... | 380/270 |

FOREIGN PATENT DOCUMENTS

WO    WO 2009/018241    *    7/2008

* cited by examiner

*Primary Examiner* — Omar Ghowrwal
*Assistant Examiner* — Angel Brockman

(57) ABSTRACT

A system may receive, from a user device, a request to receive content via a first base station, where the content was previously being received, as multicast content, via a second base station; determine, in response to the request, whether the first base station can process multicast content; transmit a copy of the content, to the user device via the first base station, as multicast content, based on a determination that the first base station can process multicast content; and transmit the content, to the user device via the first base station, as unicast content, based on a determination that the first base station cannot process multicast content.

18 Claims, 7 Drawing Sheets

US 9,007,980 B2

MULTICAST-UNICAST HANDOFF SERVICES

BACKGROUND

A user device may communicate with a network via a base station that processes traffic that is transmitted between the user device and the network. The user device may communicate with the network while moving between cells associated with different base stations. When moving between the cells, communications between the network and the user device may be maintained by a handing off operation that allows the user device to exit one cell and enter another cell without experiencing a service disruption.

A user device may, for example, exit a cell, associated with a base station and may be handed off to another cell, associated with another base station, that the user device is entering. The handoff of the user device from the base station to the other base station may allow the user device to communicate with the network without a disruption in the connection with the network. However, while most base stations can process unicast traffic, many base stations cannot process multicast traffic. Thus, a user device, receiving multicast traffic from a base station, may not be able to receive the multicast traffic when the user device is handed off to another base station that cannot process the multicast traffic.

DETAILED DESCRIPTION OF PREFERRED EMBODIMENTS

The following detailed description refers to the accompanying drawings. The same reference numbers in different drawings may identify the same or similar elements.

Systems and/or methods, described herein, may enable a user device, that is receiving content via a multicast stream (hereinafter referred to as "multicast content") from a base station, to be handed off to another base station, that cannot perform multicast processing, from which the content may be received via a unicast stream (hereinafter referred to as "unicast content"). The systems and/or methods may permit the user device to receive and/or play the unicast content, from a point that corresponds to another point that the user device stopped receiving and/or playing the multicast content.

Systems and/or methods may also enable the user device, that is receiving content, as unicast content, from a base station that cannot perform multicast processing, to be handed off to another base station, that is capable of performing multicast processing, from which a copy of the content may be received as multicast content. The systems and/or methods may permit the user device to receive and/or play the copy of the content from a point that corresponds to another point that the user device stopped receiving and/or playing the content, as unicast content.

Figure 1:
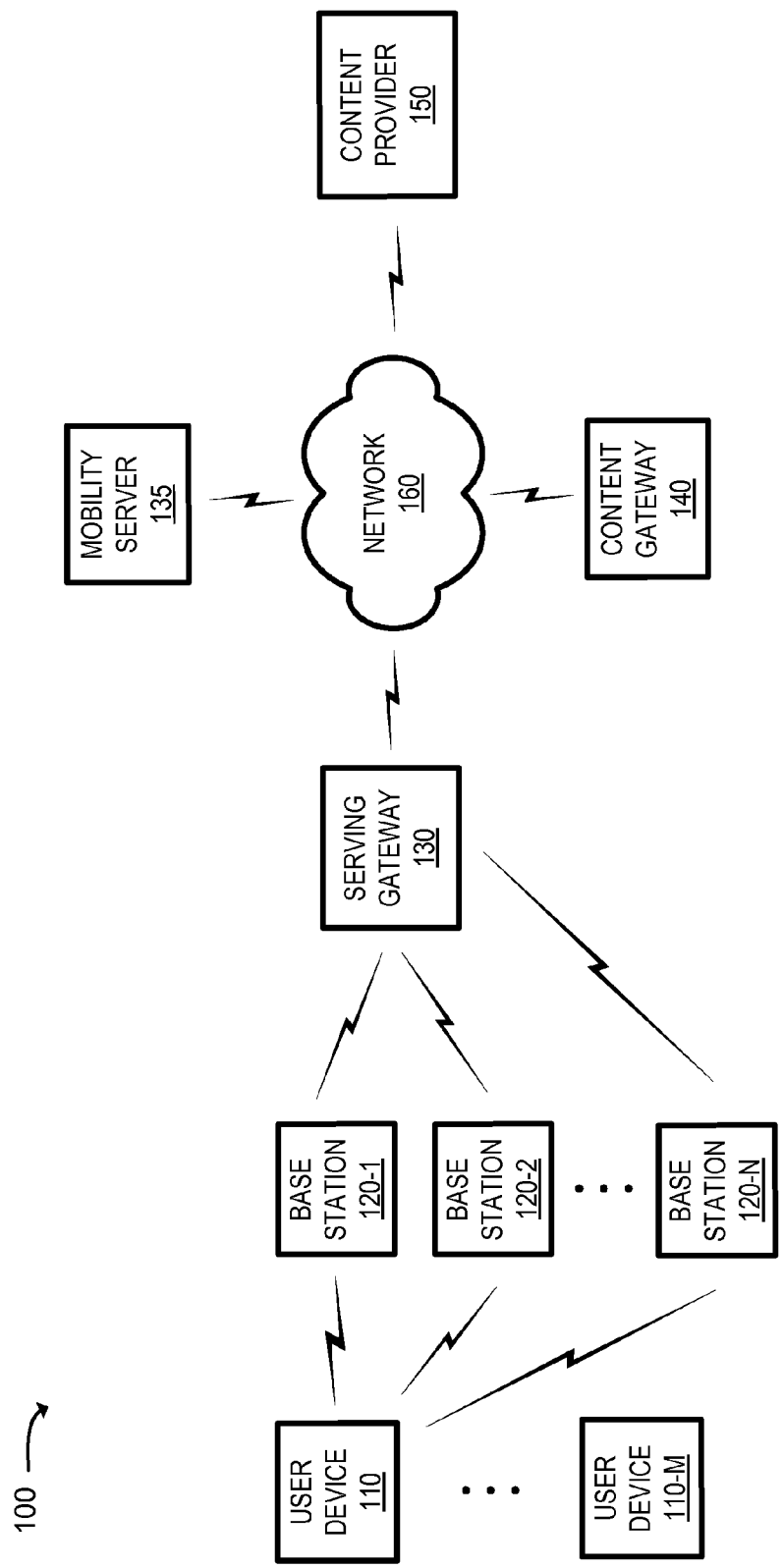
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of user devices 110-1, . . . , 110-M (where M≥1) (hereinafter referred to collectively as "user devices 110" and individually as "user device 110"), a group of base stations 120-1, . . . , 120-N (where N≥1) (hereinafter referred to collectively as "base stations 120" and individually as a "base station 120"), a serving gateway 130 (hereinafter referred to as a "SGW 130"), a mobility server 135, a content gateway 140, a content provider 150, and a network 160.

The number of devices, illustrated in FIG. 1, is provided for explanatory purposes only. In practice, there may be additional devices; fewer devices; different devices; or differently arranged devices than illustrated in FIG. 1. Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

User device 110 may include any computation or communication device, such as a wireless mobile communication device that is capable of communicating with base station 120 and/or a network (e.g., network 160). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from network 160.

User device 110 may, for example, receive content (e.g., streaming video, streaming audio, streaming data, etc.), as unicast content, from network 160 via base station 120. User device 110 may, in another example, receive content, as multicast content, from network 160 via base station 120. User device 110 may use a client application to communicate with network 160 while moving between cells associated with base station 120 and/or another base station 120. When moving between the cells and/or base stations 120, the client application may cause user device 110 to communicate with base station 120 and/or the other base station 120 that allows user device 110 to be handed off, by network 160, between the cells and/or base stations 120.

User device 110 may move from a cell associated with base station 120 that is capable of performing multicast processing to another cell associated with the other base station 120 that is not capable of multicast processing. User device 110 may receive content, as multicast content, via the cell and may be handed off to the other cell, and may receive the content, as unicast content, via the other cell. In another example, user device 110 may receive content, as unicast content, via the other cell and may be handed off to the cell, and may receive the content, as multicast content, via the cell.

Base station 120 may include one or more devices that receive, process, and/or transmit traffic, such as audio, video, text, and/or other data, destined for and/or received from user device 110. Base station 120 may receive traffic from and/or send traffic to network 160. Base station 120 may send traffic to and/or receive traffic from user device 110 via an air interface. Base station 120 may enforce uplink and/or downlink policies (e.g., via rate policing, etc.).

Base station 120 may include one or more virtual local area networks (VLANs) with which to transport the traffic. In one example, base station 120 may receive traffic (e.g., unicast content), that is destined for user device 110, via a port associated with a VLAN. The VLAN may enable the traffic to be transmitted to user device 110 via another port that is connected to user device 110. In another example implementation, base station 120 may include a multicast VLAN (MVLAN) with which to transport multicast traffic to one or more user devices 110. The MVLAN may include one or more ports that are configured based on a group membership, associated with multicast content, that identifies a group of user devices 110. In one example, base station 120 may receive, via a port associated with the MVLAN, multicast content that is destined for the group of user devices 110. The MVLAN may enable copies of the multicast content to be generated for each user device 110 associated with the group membership. The MVLAN may enable the copies of the multicast content to be transmitted to the group of user devices 110, via the one or more MVLAN ports that are connected to the group of user devices 110.

Base stations 120 may be capable of processing unicast content. A portion of base stations 120 may be capable of processing unicast and multicast content. Base station 120 may, for example, process unicast content, received from content gateway 140 and/or content provider 150, via network 160, and may transmit the unicast content to user device 110. Another base station 120 may be capable of processing content as unicast content and/or multicast content. For example, the other base station 120 may receive content from content gateway 140. The other base station 120 may distribute the content, as multicast content, to a group of user devices 110 that are associated with a group membership associated with the multicast content.

SGW 130 may include one or more devices, or other types of computation or communication devices, that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 130 may, for example, aggregate traffic received from one or more base stations 120 and may send the aggregated traffic to network 160. SGW 130 may also receive traffic from network 160 and may send the received traffic to user device 110 via base station 120. SGW 130 may perform handoff operations between cells and/or base stations 120 via which user device 110 is communicating.

Mobility server 135 may include one or more devices, or other types of computation or communication devices, that gather, process, search, store, and/or provide information in a manner described herein. In an example implementation, mobility server 130 may be a mobility management entity (MME) device. In another example implementation, mobility server 135 may perform handoff operations on user device 110. Mobility server 135 may receive a handoff notification, from user device 110 and via base station 120, that indicates that user device 110 is entering a cell associated with another base station 120. Mobility server 130 may communicate with network 160, SGW 130, and base stations 120 to perform a handoff operation on user device 110. Mobility server 130 may, for example, instruct SGW 130 to establish a communication path (e.g., based on a tunneling protocol) that allows user device 110 to communicate with network 160 via signal bearers, such as the other base station 120, SGW 130, etc. Mobility server 130 may communicate with the other base station 120 indicating that user device 110 is to be granted access to network 160 via the other base station 120. Mobility server 130 may communicate with base station 120 to release user device 110 when the handoff, to the other base station 120, has occurred.

Content gateway 140 may include one or more devices, or other types of computation or communication devices, that gather, process, search, store, and/or provide information in a manner described herein. In an example implementation, content gateway 140 may process unicast and/or multicast content to be distributed to one or more user devices 110. For example, content gateway 140 may receive content (e.g., streaming video and/or audio, progressive video and/or audio, etc.) from content provider 150. Content gateway 140 may transmit the content to user device 110 via network 160, SGW 130 and/or base station 120. Content gateway 140 may buffer the content to ensure that the content is transmitted at a bandwidth and/or data rate that conforms to a policy associated with network 160, that abides by a service level agreement with user device 110, and/or that can be processed by user device 110.

Content gateway 140 may transmit the content as unicast content or multicast content. For example, content gateway 140 may transmit unicast content that is destined for user device 110 based on information associated with user device 110, such as a destination address (e.g., an Internet protocol (IP) address, a media access control (MAC) address, a port identifier, etc.), a device identifier (e.g., an international mobile subscriber identity (IMSI) number, mobile directory number (MDN), mobile subscriber integrated services digital network (MSISDN) number, etc.), etc. In another example, content gateway 140 may transmit the content as multicast content that is destined for a group of user devices 110 (e.g., associated with a multicast group membership) based on information associated with the each of the group of user devices 110. When transmitting the multicast content, content gateway 140 may transmit a multicast stream to base station 120 for distribution to one or more user devices 110 identified by the multicast stream. In another example, content gateway 140 may transmit a copy of the multicast stream to another base station 120 for distribution to another one or more user devices 110 identified by the copy of the multicast stream.

Content gateway 140 may verify that base station 120 is capable of processing multicast content before transmitting content, as multicast content, to base station 120 for distribution to user device 110. Content gateway 140 may, for example, transmit the content, as unicast content, based on a determination that base station 120 is not capable of processing multicast content.

Content gateway 140 may receive a request for content from user device 110 that is being handed off to a cell associated with base station 120. The request may be received, by content gateway 140, via another cell and/or another base station 120 from which user device 110 is being handed off. The request may include information associated with the content (e.g., a content identifier, a content title, etc.), information associated with user device 110 (e.g., an IMSI, a MDN, a MSISDN, etc.), information that identifies a quantity of the content that has been received (e.g., via the other cell) and/or played by the user device. The request may also include information associated with the cell and/or base station 120, and/or the other cell and/or other base station 120. Content gateway 140 may determine whether base station 120 can process multicast content. Content gateway 140 may, based on a determination that base station 120 can process multicast content, generate a copy of the content as multicast content. Content gateway 140 may, in response to the request, transmit all or a portion of the multicast content to base station 120. In one example, the portion of the multicast content may include another quantity of the content that has not been received and/or played by user device 110. In another example, content gateway 140 may, based on a determination that base station 120 cannot process multicast content, generate a copy of the content as unicast content. Content gateway 140 may, in response to the request, transmit all or a portion of the unicast content to base station 120 in a manner described above.

Content provider 150 may include any type or form of content provider. For example, content provider 150 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Youtube, Vimeo, Netflix, Hulu, Veoh, etc.) that stream content from web sites and/or permit content to be downloaded (e.g., via progressive download, etc.). Content provider 150 may include on-demand content providers (e.g., video on demand (VOD), pay per view (PPV), etc.). A media stream, as used herein, may refer to a stream of content that includes video content (e.g., a video stream), audio content (e.g., an audio stream), and/or textual content (e.g., a textual stream).

Network 160 may include one or more wired and/or wireless networks. For example, network 160 may include a cellular network, a public land mobile network (PLMN), a second generation (2G) network, a third generation (3G) network, a fourth generation (4G) network, a fifth generation (5G) network, and/or another network. Additionally, or alternatively, network 160 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2:
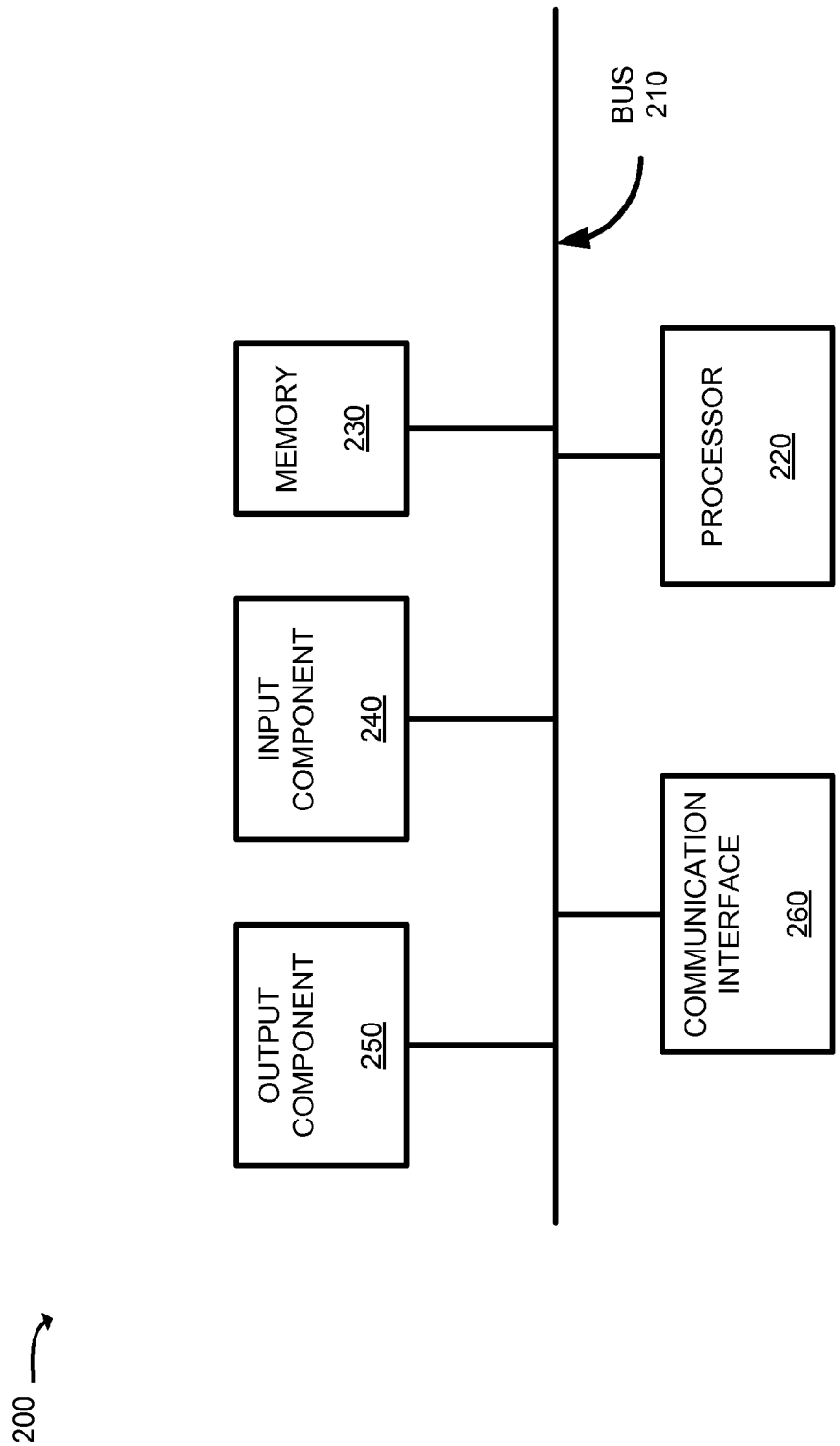
FIG. 2 is a diagram of example components of one or more devices of FIG. 1.

FIG. 2 is a diagram of example components of a device 200. Device 200 may correspond to user device 110 and/or content provider 150. Alternatively, or additionally, each of user device 110 and/or content provider 150 may include one or more devices 200.

Device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 160. In one alternative implementation, communication interface 260 may be a logical component that includes input and output ports, input and output systems, and/or other input and output components that facilitate the transmission of data to other devices.

As described herein, device 200 may perform certain operations relating to performing a multicast-to-unicast or unicast-to-multicast handoff. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
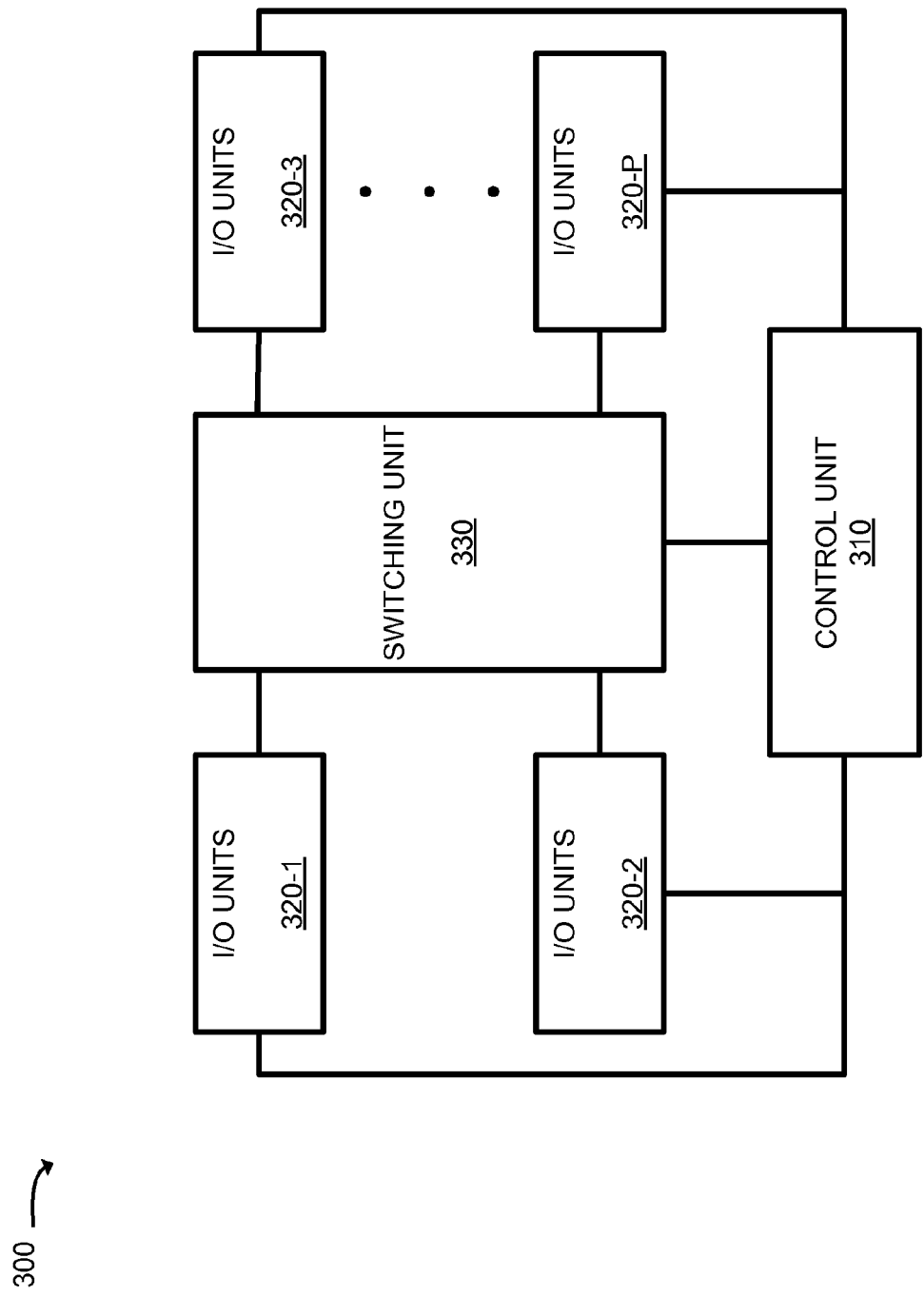
FIG. 3 is a diagram of example components of another one or more devices of FIG. 1.

FIG. 3 is a diagram of example components of device 300 that may correspond to one or more of base station 120, SGW 130, and/or content gateway 140. Alternatively, or additionally, base station 120, SGW 130, and/or content gateway 140 may include one or more devices 300. Although, FIG. 3 illustrates example components of device 300, in other implementations, device 300 may include additional components, fewer components, different components, or differently arranged components than those illustrated in FIG. 3 and described herein. Additionally, or alternatively, one or more operations described as being performed by a particular component of device 300 may be performed by one or more other components, in addition to or instead of the particular component of device 300.

Device 300 may receive network traffic, as one or more packet stream(s), from physical links, may process the packet stream(s) to determine destination information, and may transmit the packet stream(s) out on links in accordance with the destination information. Device 300 may include a control unit 310, a set of input/output (I/O) units 320-1, ..., 320-P (where P≥1) (hereinafter referred to collectively as "I/O units 320" and individually as "I/O unit 320"), and a switching unit 330.

Control unit 310 may include a processor, a microprocessor, or some form of hardware logic (e.g., an application specific integrated circuit (ASIC) or a field programmable gate array (FPGA)). In one example implementation, control unit 310 may include an Ethernet controller and/or another controller device. Control unit 310 may perform high level management functions for device 300. For example, control unit 310 may maintain the connectivity and manage information/data necessary for transferring data by device 300. Control unit 310 may create routing tables based on network topology information, create forwarding tables based on the routing tables, and communicate the forwarding tables to I/O units 320. I/O units 320 may use the forwarding tables to perform route lookup for incoming data and perform the forwarding functions for device 300. Control unit 310 may also perform other general control and monitoring functions for device 300.

I/O unit 320 may include a component or collection of components to receive incoming data, to process incoming and/or outgoing data, and/or to transmit outgoing data. For example, I/O unit 320 may include I/O ports, an Ethernet interface and/or another type of interface, a central processing unit (CPU), and/or a memory device. I/O unit 320 may include a collection of ports that receive or transmit data via physical links I/O unit 320 may also include data processing component(s), switch interface component(s), Internet processor component(s), memory device(s), etc.

Each of I/O units 320 may be connected to control unit 310 and switching unit 330. I/O units 320 may receive data on physical links connected to a network (e.g., network 160). Each physical link could be one of many types of transport media, such as an optical fiber or an Ethernet cable.

I/O units 320 may process incoming data prior to transmitting the data to another I/O unit 320 or a physical link. I/O units 320 may perform route lookups for the data using the forwarding table from control unit 310 to determine destination information. If the destination indicates that the data should be sent out on a physical link, connected to I/O unit 320, then I/O unit 320 may prepare the data for transmission by, for example, adding any necessary headers and/or modifying existing headers, and/or transmitting the data from the port associated with the physical link. If the destination indicates that the data should be sent to another I/O unit 320 via switching unit 330, then I/O unit 320 may, if necessary, prepare the data for transmission to the other I/O unit 320 and/or may send the data to the other I/O unit 320 via switching unit 330.

Switching unit 330 may include one or multiple switching planes to facilitate communication among I/O units 320 and/or control unit 310. In one implementation, each of the switching planes may include a single-stage switch or a multi-stage switch of crossbar elements. Switching unit 330 may also, or alternatively, include processors, memories, and/or paths that permit communication among I/O units 320 and/or control unit 310.

As described herein, device 300 may perform certain operations associated with performing a multicast-to-unicast or a unicast-to-multicast handoff of user device 110. Device 300 may perform these operations in response to control unit 310 and/or one or more I/O units 320 executing software instructions contained in a computer-readable medium, such as a memory associated with control unit 310 and/or the one or more I/O units 320, respectively. The software instructions may be read into the memory from another computer-readable medium or from another device. The software instructions contained in the memory may cause control unit 310 and/or the one or more I/O units 320 to perform processes described herein. Alternatively, hardwired circuitry may be used in place of or in combination with software instructions to implement processes described herein. Thus, implementations described herein are not limited to any specific combination of hardware circuitry and software.

Figure 4:
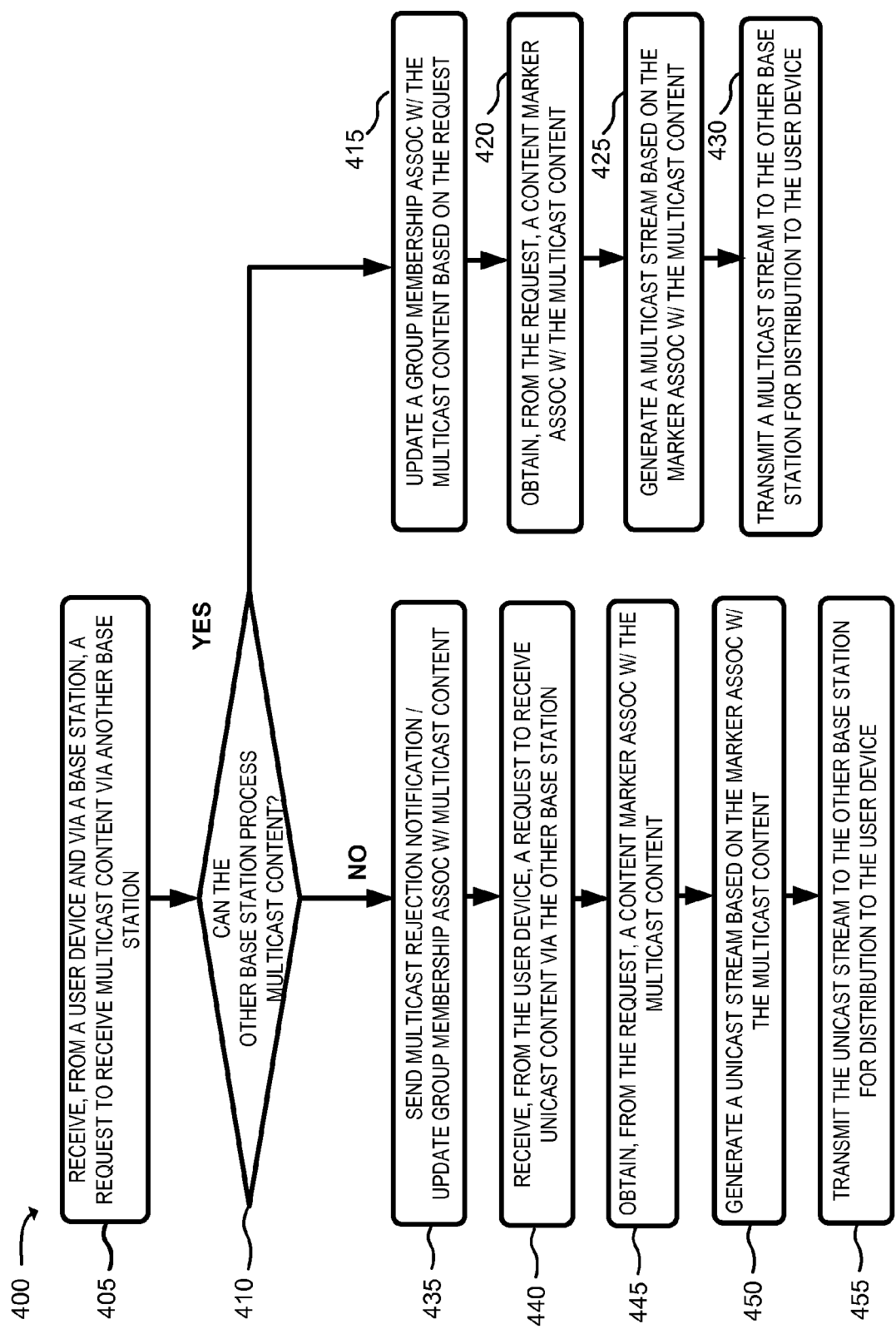
FIG. 4 is a flow chart of an example process for performing a multicast-to-unicast handoff of a user device, according to an implementation described herein.
Figure 5:
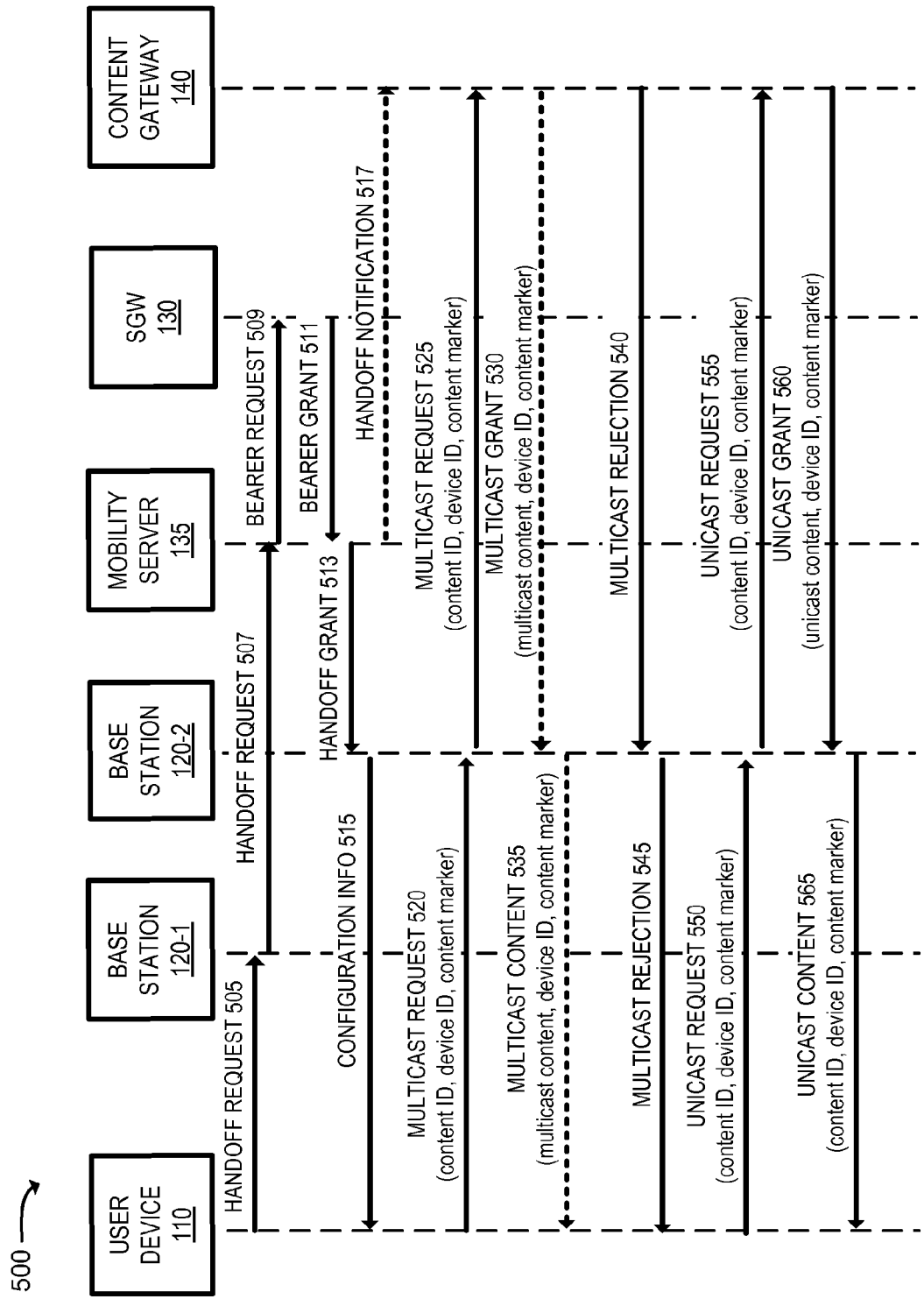
FIG. 5 is an example signal flow diagram associated with a multicast-to-unicast handoff operation within an example portion of the environment of FIG. 1.

FIG. 4 is a flow chart of an example process 400 for performing a multicast-to-unicast handoff of user device 110, according to an implementation described herein. In one example implementation, process 400 may be performed by content gateway 140. In another example implementation, some or all of process 400 may be performed by a device or collection of devices separate from, or in combination with content gateway 140. FIG. 5 is an example signal flow diagram associated with a multicast-to-unicast handoff operation within an example portion 500 of the environment 100. As illustrated in FIG. 5, example environment portion 500 may include user device 110, base station 120-1, base station 120-2, SGW 130, mobility server 135, and content gateway 140. User device 110, base station 120-1, base station 120-2, SGW 130, and/or content gateway 140 may include features described above in connection with one or more of FIGS. 1-3. A portion of process 400 of FIG. 4 will be discussed below with corresponding references to the operations performed by example environment portion 500 of FIG. 5.

As shown in FIG. 4, process 400 may include receiving, from a user device and via a base station, a request to receive multicast content via another base station (block 405). For example, user device 110 may be a mobile device that is leaving a cell, associated with base station 120-1 and entering another cell associated with base station 120-2. Assume, in this example, that base station 120-1 processes content, received as multicast content, and that user device 110 is receiving the multicast content via base station 120-1. User device 110 may send a request to be handed off to base station 120-2, as handoff request 505 (FIG. 5), to base station 120-1. The request to be handed off may identify the other cell and/or base station 120-2 to which user device 110 requests to be handed off.

Base station 120-1 may receive the handoff request and may send another handoff request, as handoff request 507 (FIG. 5), to mobility server 135. Mobility server 135 may receive the other handoff request and may send a request to establish signal bearers, as bearer request 509 (FIG. 5), to SGW 130. The request to establish bearers may enable SGW 130 to establish a network path (e.g., via a tunneling protocol) associated with base station 120-2, SGW 130, and/or other signal bearer devices associated with network 160 (e.g., such as packet data network (PDN) gateway, etc.). SGW 130 may, in response to the request to establish the signal bearers, send an indication that signal bearers have been established, as bearer grant 511 (FIG. 5), to mobility server 135. Mobility server 135 may receive the indication that the signal bearers have been established and may send an instruction to communicate with user device 110, as handoff grant 513 (FIG. 5), to base station 120-2. Base station 120-2 may receive the instruction and may send configuration information, as configuration information (info) 515 (FIG. 5), to user device 110. The configuration information may identify protocols, channels, policies, etc. that user device 110 is to use when communicating with base station 120-2.

Mobility server 135 may send a notification indicating that user device 110 has been handed off, from base station 120-1, to base station 120-2, as handoff notification 517 (FIG. 5), to content gateway 140. In another example implementation, the handoff notification may be sent by SGW 130 to content gateway 140.

User device 110 may receive the configuration information and may use the configuration information to set up user device 110 to communicate with base station 120-2. User device 110 may, as a result of being handed over to base station 120-2, send a request to receive multicast content, as multicast request 520 (FIG. 5), to base station 120-2. The request to receive multicast content may include information associated with user device 110, such as a device identifier (e.g., an MDN, an IMSI number, a MSISDN, etc.), a network address (e.g., an IP address, a MAC address, etc.), etc. The request to receive multicast content may also include information associated with the multicast content (e.g., a content identifier, a content title, etc.), a content marker (e.g., that identifies a portion of the multicast content that has been received and/or played by user device 110), etc. Base station 120-2 may receive the request for multicast content and may send another request for the multicast content, as multicast request 525 (FIG. 5), to content gateway 140. Content gateway 140 may receive the other request for multicast content and may retrieve, from a memory associated with content gateway 140, information associated with base stations 120. The other request for multicast content may include the information associated with user device 110, the information associated with the multicast content, the content marker, etc.

As also shown in FIG. 4, if the other base station can process multicast content (block 410—YES), then process 400 may include updating a group membership, associated with the multicast content, based on the request (block 415) and obtaining, from the request, a marker associated with the multicast content (block 420). For example, content gateway 140 may retrieve information, associated with base stations 120, from a memory associated with content gateway 140. The information associated with base stations 120 may identify which of base stations 120 are capable of processing the content as multicast content. Content gateway 140 may, for example, determine that base station 120-2 is capable of processing multicast content based on the information associated with base stations 120.

Content gateway 140 may, as a result of the determination that base station 120-2 can process the multicast content, update a group membership associated with the multicast traffic. Content gateway 140 may update the group membership based on the handoff, of user device 110, to the other cell associated with base station 120-2. Content gateway 140 may, for example, store an entry, associated with user device 110, in a data structure, associated with the group membership, that indicates user device 110 has been handed off to the other cell and/or base station 120-2. The entry may include information associated with user device 110, information associated with the other cell (e.g., a cell identifier), information associated with base station 120-2 (e.g., a device identifier, a network address, etc.), a time at which the handoff occurred, and/or information associated with a port and/or MVLAN via which the multicast content is to be distributed to user device 110.

Content gateway 140 may obtain, from the request for the multicast content, a marker that identifies a point, associated with the multicast content, at which user device 110 stopped receiving and/or playing the multicast content that was received via the cell and/or base station 120-1 (e.g., prior to the time at which the handoff occurred).

As further shown in FIG. 4, process 400 may include generating a multicast stream based on the content marker associated with the multicast content (block 425) and transmitting the multicast content to the other base station for distribution to the user device (430). For example, content gateway 140 may generate a notification indicating that the request for the multicast content has been granted, as multicast grant 530 (e.g., shown as a dotted arrow in FIG. 5), to base station 120-2 and via SGW 130. In one example, the notification may include a copy of the multicast content, information associated with the content (e.g., a content identifier, title, etc.), and/or the content marker associated with the multicast content. In this example, the copy of the multicast content may, for example, be generated as a multicast stream that starts from a point that corresponds to the content marker. In another example implementation, content gateway 140 may send the notification without the copy of the multicast content. For example, content provider 140 may send the notification in a manner that includes the information associated with the multicast content, the content marker associated with the multicast content, and/or an indication that base station 120-2 is to generate and/or distribute the multicast content to user device 110.

Base station 120-2 may receive the notification indicating that the request for the multicast content has been granted and may transmit the copy of the multicast traffic, as multicast content 535 (e.g., shown as a dotted arrow in FIG. 5), to user device 110. In one example, base station 120-2 may transmit the copy of the multicast content, as a multicast stream, that is received from content gateway 140. In another example implementation, base station 120-2 may generate a copy of the multicast content and may transmit the copy of the multicast content, as a multicast stream, to user device 110. The multicast stream may be transmitted, by base station 120-2, based on the content marker associated with the multicast content. User device 110 may receive and/or play the copy of the multicast content from a point at which user device 110 stopped receiving and/or playing the multicast content via the cell associated with base station 120-1.

As yet further shown in FIG. 4, if the other base station cannot process multicast content (block 410—NO), then process 400 may include sending a rejection notification and updating a group membership, associated with the multicast membership group (block 435). For example, content gateway 140 may retrieve information, associated with base stations 120, from a memory associated with content gateway 140. Content gateway 140 may, for example, determine that base station 120-2 is not capable of processing the content, as multicast content, based on the information associated with base stations 120. Content gateway 140 may transmit, based on the determination that base station 120-2 cannot process multicast content, a notification that the request for the multicast content has been rejected, as multicast rejection 540 (FIG. 5), to base station 120-2.

Content gateway 140 may, as a result of the determination that base station 120-2 cannot process the multicast content, update a group membership associated with the multicast traffic. Content gateway 140 may update the group membership based on the handoff, of user device 110, to the other cell associated with base station 120-2. Content gateway 140 may, for example, store an entry, associated with user device 110, in a data structure, associated with the group membership, that indicates that user device 110 has been removed from the multicast group membership based on the handoff to base station 120-2. In another example, content gateway 140 may disassociate user device 110 from an MVLAN via which the multicast content is transmitted to user device 110. Base station 120-2 may receive the notification and may transmit another notification that the request for the multicast content has been rejected, as multicast rejection 545 (FIG. 5), to user device 110.

As still further shown in FIG. 4, process 400 may include receiving a request for unicast content via the other base station (block 445). For example, user device 110 may receive the other notification that the request for the multicast content has been rejected and a client application, hosted by user device 110, may generate a request for the content, as unicast content, and may send the request for unicast content, as unicast request 550, to base station 120-2. The request for unicast content may include information associated with user device 110, such as a device identifier (e.g., an MDN, an IMSI number, a MSISDN, etc.), a network address (e.g., an IP address, a MAC address, etc.), etc. The request to receive the unicast content may also include information associated with the content (e.g., a content identifier, title, etc.), a content marker (e.g., that identifies a portion of the multicast content that has been received and/or played by user device 110), etc.

Base station 120-2 may receive the request for the unicast content and may send another request for the unicast content, as unicast request 555 (FIG. 5), to content gateway 140. Content gateway 140 may receive the other request for the unicast content. The other request for the unicast content may include the information associated with user device 110, the information associated with the content, the content marker, etc.

As also shown in FIG. 4, process 400 may include generating a unicast stream based on the content marker associated with the multicast content (block 450) and transmitting the unicast content to the other base station for distribution to the user device (block 455). For example, content gateway 140 may generate a notification indicating that the request for the unicast content has been granted, as unicast grant 560 (FIG. 5), to base station 120-2 and via SGW 130. In one example, the notification may include the unicast content, information associated with the content, and/or the content marker. Content gateway 140 may transmit the unicast content, as a unicast stream, starting from a point that corresponds to the content marker.

Base station 120-2 may receive the notification indicating that the request for the unicast content has been granted and may transmit the unicast content, as unicast content 565 (FIG. 5), to user device 110. The unicast stream may be transmitted, by base station 120-2, based on the content marker associated with the multicast content. User device 110 may receive and/or play the unicast content from that point at which user device 110 stopped receiving and/or playing the multicast content via the cell associated with base station 120-1.

Figure 6:
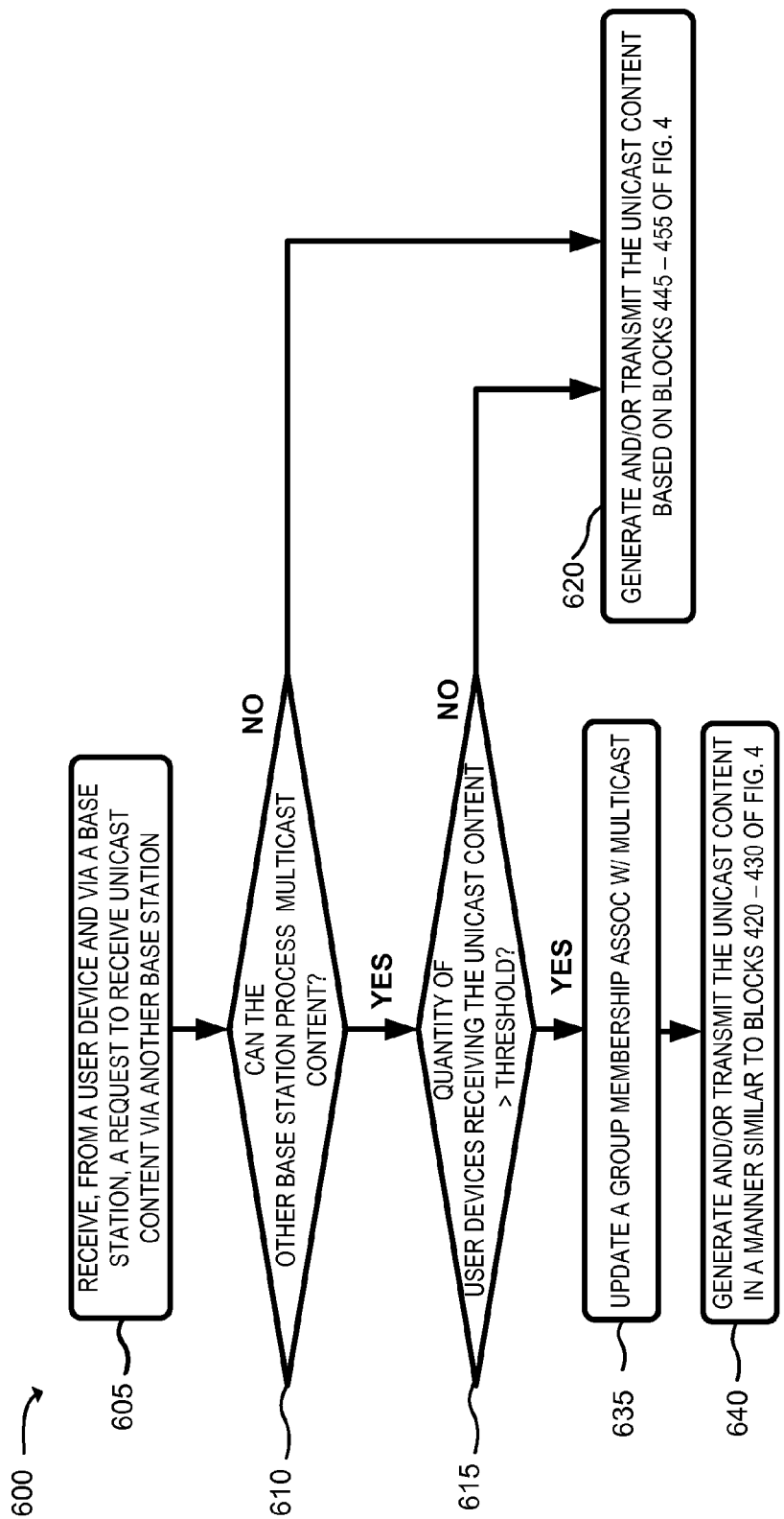
FIG. 6 is a flow chart of an example process for performing unicast-to-multicast handoff of a user device, according to an implementation described herein.
Figure 7:
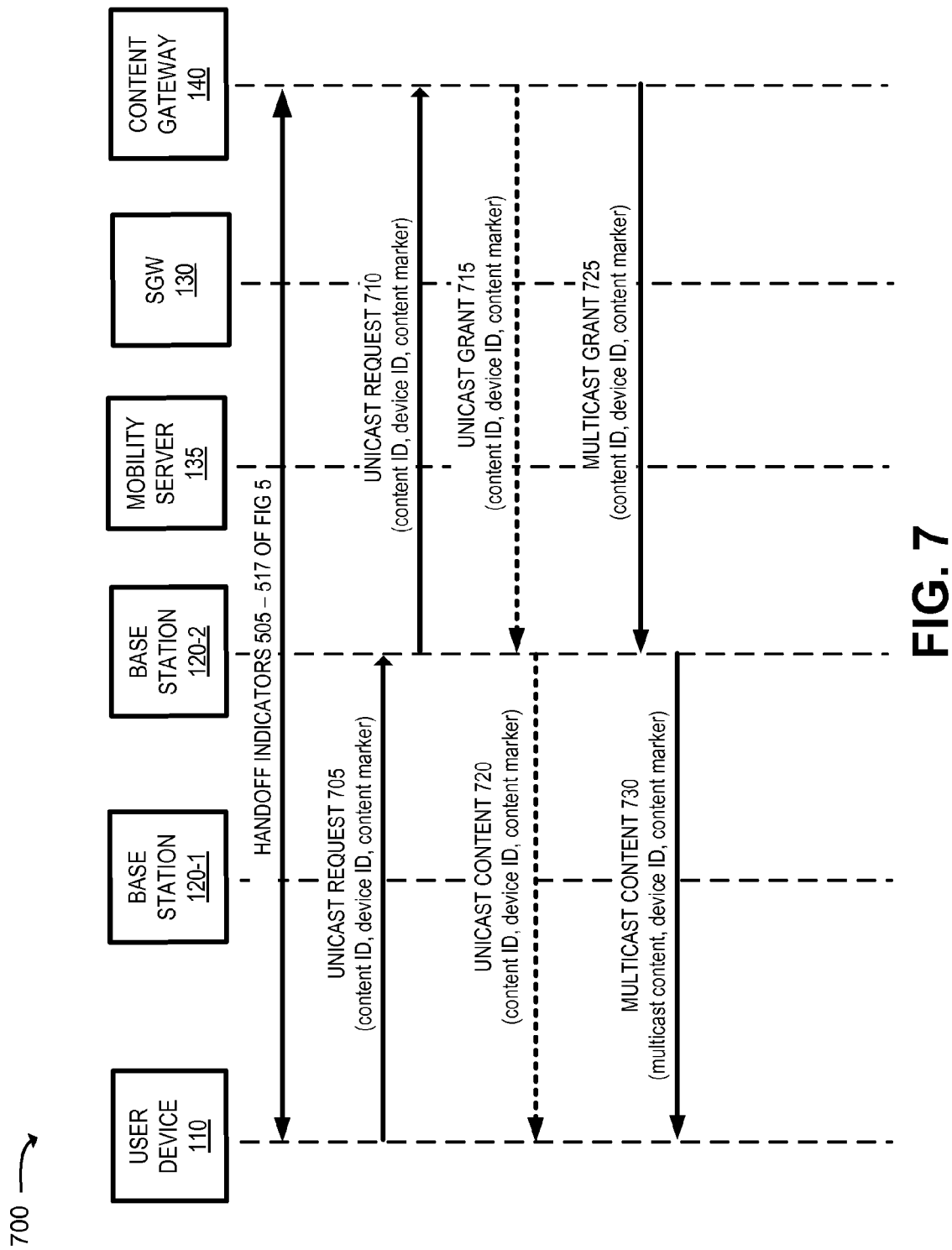
FIG. 7 is an example signal flow diagram associated with a unicast-to-multicast handoff operation within an example portion of the environment of FIG. 1.

FIG. 6 is a flow chart of an example process 600 for performing a unicast-to-multicast handoff of user device 110, according to an implementation described herein. In one example implementation, process 600 may be performed by content gateway 140. In another example implementation, some or all of process 600 may be performed by a device or collection of devices separate from, or in combination with content gateway 140. FIG. 7 is an example signal flow diagram associated with a unicast-to-multicast handoff operation within an example portion 700 of environment 100. As illustrated in FIG. 7, example environment portion 700 may include user device 110, base station 120-1, base station 120-2, SGW 130, mobility server 135, and content gateway 140. User device 110, base station 120-1, base station 120-2, SGW 130, and/or content gateway 140 may include features described above in connection with one or more of FIGS. 1-3. A portion of process 600 of FIG. 6 will be discussed below with corresponding references to the operations performed by example environment portion 700 of FIG. 7.

As shown in FIG. 6, process 600 may include receiving, from a user device and via a base station, a request to receive unicast content via another base station (block 605). For example, user device 110 may be a mobile device that is leaving a cell, associated with base station 120-1 and entering another cell associated with base station 120-2. Assume, in this example, that base station 120-1 cannot process multicast content and that user device 110 is receiving unicast content via base station 120-1. User device 110 may, in a manner similar to that described above (e.g., with respect to block 405 of FIG. 4), communicate with mobility server 135 to be handed off from the cell associated with base station 120-1 to another cell associated with base station 120-2 (e.g., as represented in FIG. 7 by handoff indicators 505-517 of FIG. 5)).

User device 110 may, as a result of being handed off to base station 120-2, send a request to receive unicast content, as unicast request 705 (FIG. 7), to base station 120-2. The request to receive the unicast content may include information associated with user device 110, such as a device identifier (e.g., an MDN, an IMSI number, a MSISDN, etc.), a network address (e.g., an IP address, a MAC address, etc.), etc. The request to receive the unicast content may also include information associated with the unicast content (e.g., a content identifier, a content title, etc.), a content marker (e.g., that identifies a portion of the unicast content that has been received and/or played by user device 110), etc. Base station 120-2 may receive the request for the unicast content and may send another request for the unicast content, as unicast request 710 (FIG. 7), to content gateway 140. Content gateway 140 may receive the other request for unicast content and may retrieve, from a memory associated with content gateway 140, information associated with base stations 120. The other request for unicast content may include the information associated with user device 110, the information associated with the unicast content, the content marker, etc.

As also shown in FIG. 6, if the other base station cannot process multicast content (block 610—NO), then process 600 may include obtaining, from the request, a content marker associated with the unicast content (block 620). Alternatively, if the other base station can process multicast traffic (block 610—YES) and a quantity of user devices receiving the unicast content is not greater than a threshold (block 615—NO), then process 600 may include generating and/or transmitting the unicast content based on blocks 445-455 of FIG. 4 (block 620). For example, content gateway 140 may retrieve, information, associated with base stations 120, from a memory associated with content gateway 140. The information associated with base stations 120 may identify which of base stations 120 are capable of processing the content as multicast content. Content gateway 140 may, for example, determine that base station 120-2 is not capable of processing multicast content based on the information associated with base stations 120.

In another example, content gateway 140 may determine that base station 120-2 is capable of processing multicast traffic. Based on a determination that base station 120-2 is capable of processing multicast traffic, content gateway 140 may identify whether a quantity of user devices 110, receiving the unicast traffic, is greater than a threshold. Based on a determination that the quantity of user devices 110 that are receiving the unicast traffic is not greater than the threshold, content gateway 140 may perform an operation to generate and/or transmit the unicast traffic in a manner similar to that described above (e.g., with respect to blocks 445-455 of FIG. 4). Additionally, or alternatively, based on the determination that base station 120-2 is capable of processing multicast traffic, content gateway 140 may determine that content, being transmitted as the unicast content via base station 120-1, is not being transmitted as multicast content via base station 120-2. Based on the determination that the content, being transmitted as the unicast content via base station 120-1, is not being transmitted as multicast content via base station 120-2, content gateway 140 may perform an operation to generate the unicast traffic and/or transmit the unicast traffic, to user device 110, in a manner similar to that described above (e.g., with respect to blocks 445-455 of FIG. 4).

As further shown in FIG. 6, if the other base station can process multicast content (block 610—YES) and the quantity of user devices receiving the unicast content is greater than a threshold (block 615—YES), then process 600 may include updating a membership group associated with multicast content (block 635) and generating and/or transmitting the unicast content in a manner similar to that described above (e.g., with respect to blocks 420-430 of FIG. 4) (block 640). For example, content gateway 140 may retrieve, information, associated with base stations 120, from a memory associated with content gateway 140. Content gateway 140 may, for example, determine that base station 120-2 is capable of processing multicast content based on the information associated with base stations 120.

Based on the determination that base station 120-2 is capable of processing multicast content, content gateway 140 may determine whether a quantity of user devices 110 that are receiving the content, as the unicast content and via base station 120-2, is greater than a threshold. Based on a determination that the quantity of user devices 110 that are receiving the unicast traffic is greater than the threshold, content gateway 140 may update a group membership associated with the multicast traffic. For example, content gateway 140 may store a respective entry, associated with each user device 110, in a data structure associated with the group membership. Each entry may include information associated with a respective user device 110, such as a device identifier (e.g., a MDN, an IMSI, a MSISDN, etc.), a network address (e.g., an IP address, a MAC address, etc.), etc., and/or information associated with the other cell and/or base station 120-2. Each entry may, in another example, include a respective content marker that corresponds to a point, associated with the unicast content, that a respective user device 110 stopped receiving (e.g., via base station 120-1) and/or playing the unicast content. Each entry may, in a further example, include information associated with an MVLAN that corresponds to the multicast content (e.g., an identifier associated with the MVLAN, a port identifier associated with the MVLAN, etc.). Content provider 140 may perform an operation to generate and/or transmit the multicast content, to user device 110 and via base station 120-2, in a manner similar to that described above (e.g., with respect to blocks 420-430 of FIG. 4).

Systems and/or methods, described herein, may enable a user device, that is receiving content, as multicast content, from a base station, to receive the content, as unicast content, from another base station that cannot process multicast content. The systems and/or methods may permit the user device to receive and/or play the unicast content, from a point that corresponds to another point that the user device stopped receiving and/or playing the multicast content.

Systems and/or methods may also enable a user device, that is receiving content, as unicast content, from a base station to receive the content, as multicast content, from another base station that is capable of processing multicast content. The systems and/or methods may permit the user device to receive and/or play the multicast content, from a point that corresponds to another point that the user device stopped receiving and/or playing the unicast content.

The foregoing description provides illustration and description, but is not intended to be exhaustive or to limit the implementations to the precise form disclosed. Modifications and variations are possible in light of the above disclosure or may be acquired from practice of the embodiments.

While a series of blocks has been described with regard to FIGS. 4 and 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The term network device may generally refer to any one (or more) of base station 120, SGW 130, mobility server 135, content gateway 140, or content provider 150.

What is claimed is:

1. A method, comprising: receiving, by a network device and from a first user device, a request to receive content via a first base station, where the content was previously being received by the first user device as multicast content, via a second base station; determining, by the network device and in response to the request, whether the first base station has an ability to process multicast content; transmitting a copy of the content, by the network device and to the first user device via the first base station, as multicast content, based on a determination that the first base station has the ability to process multicast content; and transmitting the content, by the network device and to the first user device via the first base station, as unicast content, based on a determination that the first base station does not have the ability to process multicast content; receiving, from a second user device, another request to receive other content via a third base station, where the other content was previously being received by the second user device, as unicast content, via a fourth base station, and where the third base station has the ability to process multicast content; identifying a quantity of plural user devices that are receiving the other content, as unicast content, via the third base station; transmitting the other content, to the second user device and via the third base station, as unicast content, when the identified quantity of the plural user devices, that are receiving the other content as unicast content, is less than a threshold quantity; and transmitting a copy of the other content, to the second user device and via the third base station, as multicast content, when the identified quantity of the plural user devices, that are receiving the other content as unicast content, is not less than the threshold quantity.

2. The method of claim 1, where the request is associated with an operation to handoff the first user device from a cell associated with the second base station to another cell associated with the first base station.

3. The method of claim 1, where determining whether the first base station has an ability to process multicast content further includes:
   retrieving, from a memory associated with the network device, information associated with one or more base stations;
   determining that the first base station has the ability to process multicast traffic when the information associated with the one or more base stations indicates that the first base station has the ability to process multicast traffic; and
   determining that the first base station does not have the ability to process multicast traffic when the information associated with the one or more base stations indicates that the first base station does not have the ability to process multicast traffic.

4. The method of claim 1 further comprising: associating the second user device and each of the plural user devices, that are receiving the other content as unicast content, with a group membership associated with the other content, as multicast content, where the group membership identifies which of the second user device or the plural user devices, that are receiving the other content as unicast content, are to receive a respective copy of the other content, as multicast content.

5. The method of claim 1, further comprising:
   obtaining, from the request, a content marker associated with the content that was previously received by the first user device, as multicast content, via the second base station, where the content marker identifies a point, associated with the content, that the first user device stopped receiving or playing the content that was previously received by the first user device, from the second base station; and
   sending an instruction, to the first base station, to transmit the content from the point that the first user device stopped receiving or playing the content that was previously received by the first user device, from the second base station.

6. The method of claim 1, further comprising:
   generating the content, as a multicast stream, based on the determination that the first base station can has the ability to process multicast content; and
   generating the content, as a unicast stream, based on the determination that the first base station does not have the ability to process multicast content.

7. A network device comprising: a memory to store information associated with a plurality of base stations, where the information associated with the plurality of base stations indicates whether each base station, of the plurality of base stations, has an ability to process unicast traffic, or has an ability to process multicast traffic; and a processor to: receive a notification that a first user device is being handed off from a first base station, of the plurality of base stations, to a second base station, of the plurality of base stations, where the notification indicates that the first base station was transmitting content, as unicast content, to the first user device, determine whether the second base station has the ability to process multicast content based on the information associated with the plurality of base stations, transmit the content, as unicast content, to the first user device and via the second base station, based on a determination that the second base station does not have the ability to process multicast content, determine whether the content is being transmitted, as multicast content, by the second base station based on a determination that the second base station has the ability to process multicast content, and transmit, to the second base station, an instruction to transmit a copy of the content, as multicast content, to the first user device based on a determination that the content is being transmitted, as multicast content, by the second base station and the second base station has the ability to process multicast content; determine that other content is not being transmitted, as multicast content, by the second base station, identify a quantity of plural user devices that are receiving the other content, as unicast content, from the second base station, transmit the other content, as unicast content, to the second base station, when the identified quantity of the plural user devices is less than a threshold, associate each of the plural user devices with a multicast group, associated with the content, when the identified quantity of the plural user devices is not less than the threshold, and transmit a respective copy of the other content, as multicast content, to each of the plural user devices associated with the multicast group.

8. The network device of claim 7, where the notification includes a content marker, associated with the content, that identifies a point, associated with the content, that the first user device stopped receiving or playing the content received via the first base station, and
   where, before transmitting the content, as unicast content, to the first user device and via the second base station, the processor is further to:
   generate a unicast stream, as the unicast content, that starts from the point that the first user device stopped receiving or playing the content.

9. The network device of claim 7, where the notification includes a content marker, associated with the content, that identifies a point, associated with the content, that the first user device stopped receiving or playing the content received via the first base station, and
   where, before transmitting the instruction to transmit a copy of the content as multicast content, the processor is further to:
   generate the instruction in a manner that includes the content marker, where the instruction indicates that the copy of the content is to be transmitted from the point that the first user device stopped receiving or playing the content.

10. The network device of claim 7, where, when transmitting the content, as unicast content, to the first user device and via the second base station, the processor is further to:
   generate a unicast stream associated with the content, and
   transmit the unicast stream to the second base station for distribution to the first user device.

11. The network device of claim 7, where, when transmitting the instruction, to transmit a copy of the content as multicast content, the processor is further to:
   generate one or more copies of the content as one or more multicast streams, and transmit the one or more multicast streams to the second base station that enables the second base station to distribute one of the one or more multicast streams to the first user device.

12. The network device of claim 7, where the memory stores information associated with a multicast membership group, and
where, when determining whether the content is being transmitted as multicast content, the processor is further to:
determine whether the information, associated with the multicast membership group, that is stored in the memory, is associated with the content and the second base station.

13. A non-transitory computer-readable medium containing one or more instructions executable by one or more processors, the computer-readable medium comprising:
one or more instructions to receive, from a user device, a request to receive content from a first base station, where a portion of the content was previously received by the user device, as multicast content, via a second base station;
one or more instructions to determine, in response to the request, whether the first base station has an ability to process multicast content;
one or more instructions to transmit a notification to the first base station based on a determination that the first base station has the ability to process multicast content, where the notification instructs the first base station to transmit a copy of the content, as multicast content, to the user device;
one or more instructions to transmit the content, as unicast content, to the user device and via the first base station, based on a determination that the first base station does not have the ability to process multicast content;
one or more instructions to transmit, to the second base station, an instruction to transmit a copy of the content, as multicast content, to the first user device based on a determination that the content is being transmitted, as multicast content, by the second base station and the second base station has the ability to process multicast content;
one or more instructions to determine that other content is not being transmitted, as multicast content, by the second base station;
one or more instructions to identify a quantity of plural user devices that are receiving the other content, as unicast content, from the second base station;
one or more instructions to transmit the other content, as unicast content, to the second base station, when the identified quantity of the plural user devices is less than a threshold,
one or more instructions to associate each of the plural user devices with a multicast group, associated with the content, when the identified quantity of the plural user devices is not less than the threshold; and
one or more instructions to transmit a respective copy of the other content, as multicast content, to each of the plural user devices associated with the multicast group.

14. The computer-readable medium of claim 13, where the copy of the content includes another portion of the content that has not been previously received by the user device via the second base station.

15. The computer-readable medium of claim 13, where the one or more instructions to transmit the content further include:
one or more instructions to transmit the content from a point that corresponds to a beginning of another portion of the content that has not been previously received by the user device via the second base station.

16. The computer-readable medium of claim 13, further comprising:
one or more instructions to generate one or more copies of the content, as one or more multicast streams, based on the determination that the first base station has the ability to process multicast content; and
one or more instructions to generate the content, as a unicast stream, based on the determination that the first base station does not the ability to process multicast content.

17. The computer-readable medium of claim 13, further comprising:
one or more instructions to store an entry, associated with the user device, in a data structure associated with a multicast group membership, based on a determination that the first base station has the ability to process multicast content,
where the multicast group membership identifies one or more user devices that are to receive one or more copies of the content, as multicast content, via the first base station, and
where the entry includes information associated with the user device or information associated with the first base station.

18. The computer-readable medium of claim 13, further comprising:
one or more instructions to associate the user device with a multicast virtual local area network (MVLAN), based on a determination that the first base station has the ability to process multicast content,
where the MVLAN enables one or more copies of the content to be distributed, as multicast content, to one or more user devices, and
where associating the user device with an MVLAN enables the user device to receive the copy of the content via a port associated with the MVLAN.

* * * * *